United States Patent
Jian et al.

(10) Patent No.: US 12,247,695 B2
(45) Date of Patent: Mar. 11, 2025

(54) SUPPORTING DEVICE WITH CHANGEABLE CLAMPING SPACE TO CLAMP TARGET OBJECT

(71) Applicant: LANTO ELECTRONIC LIMITED, Kunshan (CN)

(72) Inventors: Fuji Jian, Kunshan (CN); Yuchiang Lin, Kunshan (CN); Kuanyi Chen, Kunshan (CN)

(73) Assignee: LANTO ELECTRONIC LIMITED, Kunshan (CN)

( * ) Notice: Subject to any disclaimer, the term of this patent is extended or adjusted under 35 U.S.C. 154(b) by 0 days.

(21) Appl. No.: 18/229,735

(22) Filed: Aug. 3, 2023

(65) Prior Publication Data
US 2024/0044445 A1 Feb. 8, 2024

(30) Foreign Application Priority Data
Aug. 8, 2022 (CN) .......................... 202210941565.4

(51) Int. Cl.
*F16M 13/02* (2006.01)

(52) U.S. Cl.
CPC ..... *F16M 13/022* (2013.01); *F16M 2200/028* (2013.01)

(58) Field of Classification Search
CPC .. F16M 13/022; F16M 2200/028; F16B 2/06; F16B 2/12; F16B 7/105; F16B 7/14
USPC ..................................................... 248/316.4
See application file for complete search history.

(56) References Cited

U.S. PATENT DOCUMENTS

| 6,679,463 | B1* | 1/2004 | Chen ...................... | F16M 13/00 396/428 |
| 7,431,253 | B2* | 10/2008 | Yeh ........................ | F16M 13/00 248/231.51 |
| 7,559,517 | B2* | 7/2009 | Zhou ....................... | F16B 2/12 24/523 |
| 9,163,779 | B2 | 10/2015 | Funk et al. | |
| 2005/0230583 | A1* | 10/2005 | Wu ......................... | F16M 13/00 248/231.41 |
| 2006/0170817 | A1* | 8/2006 | Wu ......................... | H04N 23/50 348/E5.025 |
| 2008/0284922 | A1 | 11/2008 | Isobe et al. | |
| 2009/0321591 | A1* | 12/2009 | Chen ...................... | F16M 11/10 248/161 |
| 2011/0043990 | A1* | 2/2011 | Mickey ................. | G06F 1/1601 361/679.04 |

(Continued)

FOREIGN PATENT DOCUMENTS

| CN | 102829290 A | 12/2012 |
| CN | 104581303 A | 4/2015 |
| CN | 215060650 U | 12/2021 |

*Primary Examiner* — Christopher Garft
(74) *Attorney, Agent, or Firm* — Birch, Stewart, Kolasch & Birch, LLP

(57) ABSTRACT

A supporting device includes a first assembly, a second assembly and a limiting mechanism. The first assembly is capable of being connected to a supported object. The first assembly and the second assembly are configured to mate with each other. A clamping space is formed between the first assembly and the second assembly after being mated with each other. The clamping space is configured to clamp a target object. The limiting mechanism is capable of making the first assembly and the second assembly in a relatively fixed position.

20 Claims, 16 Drawing Sheets

(56) References Cited

U.S. PATENT DOCUMENTS

2019/0103078 A1* 4/2019 Park .................. G10D 1/08
2019/0390692 A1* 12/2019 Li .................. F16M 11/041

* cited by examiner

SUPPORTING DEVICE WITH CHANGEABLE CLAMPING SPACE TO CLAMP TARGET OBJECT

CROSS-REFERENCE TO RELATED APPLICATION

This patent application claims priority of a Chinese Patent Application No. 202210941565.4, filed on Aug. 8, 2022 and titled "SUPPORTING DEVICE", the entire content of which is incorporated herein by reference.

TECHNICAL FIELD

The present disclosure relates to a supporting device, which belongs to the field of brackets.

BACKGROUND

When electronic devices such as network cameras, speakers and screen hanging lamps are in use, they often need to be clamped at a target position by a supporting device, for example, the network camera is clamped above the screen by the supporting device. The supporting device in the prior art has a narrow clamping thickness range and poor applicability.

SUMMARY

An object of the present disclosure is to provide a supporting device with strong applicability, simple structure and good stability.

In order to achieve the above object, the present disclosure adopts the following technical solution: a supporting device, including: a first assembly configured to be connected to a supported object; a second assembly, the first assembly and the second assembly being configured to mate with each other; a clamping space being formed between the first assembly and the second assembly after being mated with each other; the clamping space being configured to clamp a target object; and a limiting mechanism configured to make the first assembly and the second assembly in a relatively fixed state.

In order to achieve the above object, the present disclosure adopts the following technical solution: a supporting device, including: a first assembly including an insertion portion, a first clamping portion fixedly connected with the insertion portion, and a connecting portion rotatably connected to the insertion portion; the connecting portion being configured to be connected to a supported object; a second assembly including a receiving portion and a second clamping portion fixedly connected with the receiving portion; the insertion portion being inserted into the receiving portion so as to from a changeable clamping space between the first clamping portion and the second clamping portion; the clamping space being configured to clamp a target object; and a limiting mechanism configured to make the first assembly and the second assembly in a relatively fixed state when the target object is clamped in place.

Compared with the prior art, the supporting device disclosed in the present disclosure has the following advantages: the overall structure of the supporting device is compact and light; the supporting device has strong applicability, and has low thickness requirements on a thickness of a clamped object, such as a screen. Besides, by providing an auxiliary supporting piece, the supporting device can be stably supported on a plane, increasing the application scenarios of the supporting device.

DETAILED DESCRIPTION

Figure 1:
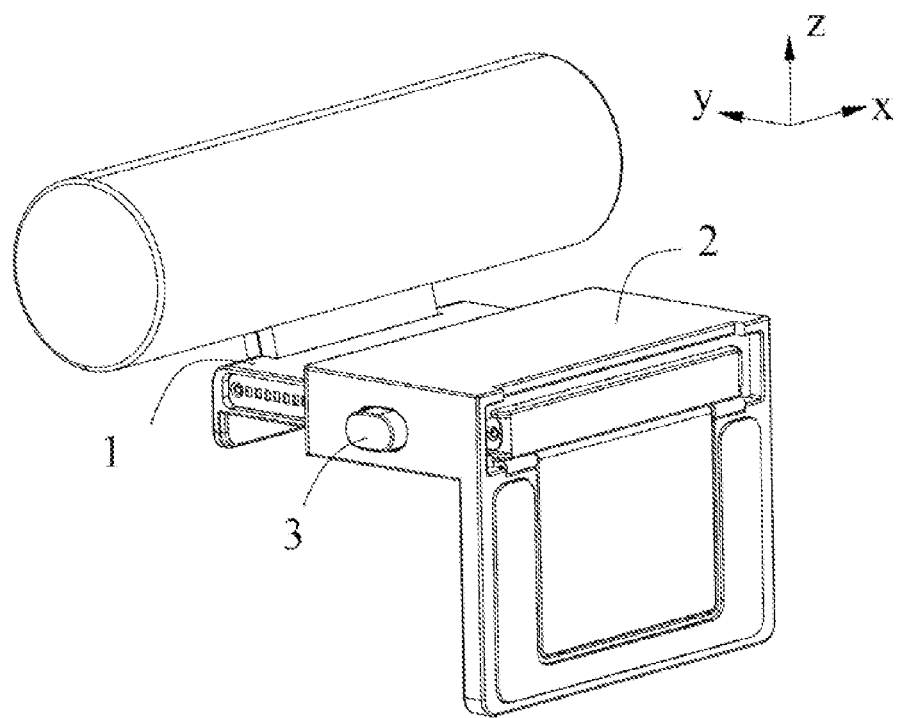
FIG. 1 is an axonometric schematic view of a supporting device in accordance with a first embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components.

Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

In order to solve the problems existing in the prior art, the present disclosure discloses a supporting device.

FIG. 1 to FIG. 11, and FIG. 12 to FIG. 16 disclose specific structures of the supporting device in accordance with a first embodiment and a second embodiment of the present disclosure, respectively. Specific embodiments of the supporting device of the present disclosure will be described below with reference to the accompanying drawings.

Referring to FIG. 1, the supporting device includes a first assembly 1, a second assembly 2, and a limiting mechanism 3 disposed between the first assembly 1 and the second assembly 2. The first assembly 1 can be connected to a supported object, such as a screen hanging lamp, a network camera, a speaker and other electronic devices. The first assembly 1 and the second assembly 2 can be mated with each other. A clamping space is formed between the first assembly 1 and the second assembly 2. The clamping space is configured to clamp a target object, such as a computer screen, and then supports the supported object on the target object.

The limiting mechanism 3 is configured to make the first assembly 1 and the second assembly 2 in a relatively fixed position.

Figure 2:
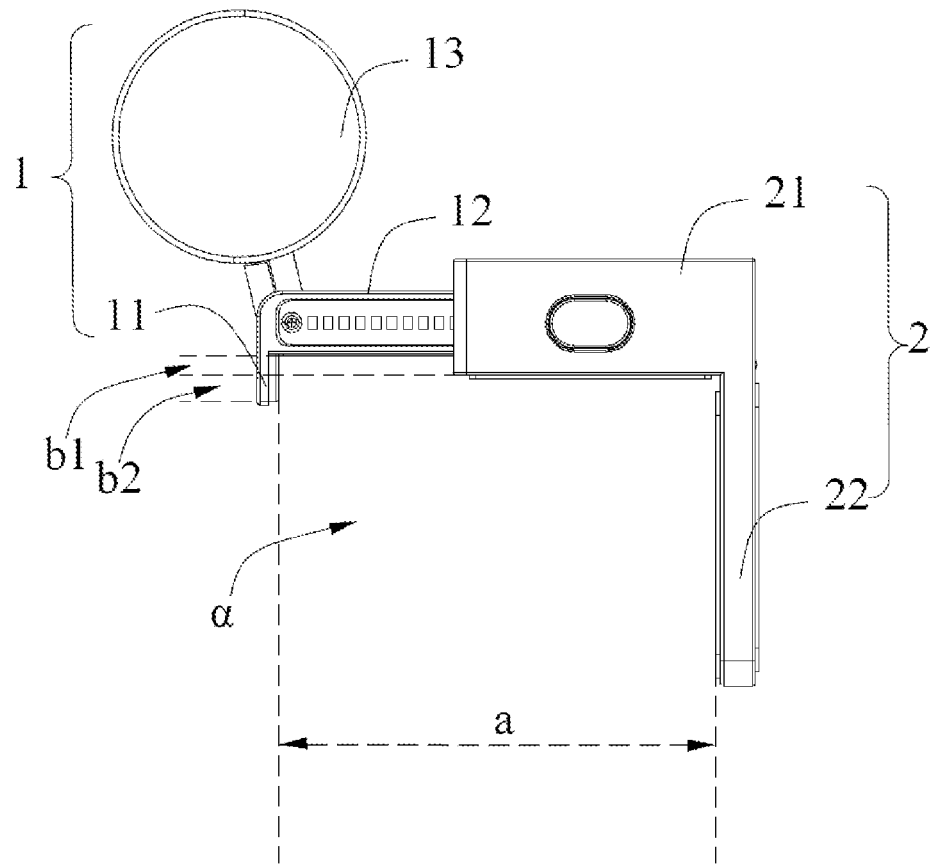
FIG. 2 is a schematic left view of the supporting device in accordance with the first embodiment of the present disclosure.

Referring to FIG. 2, the first assembly 1 includes a first clamping portion 11, an insertion portion 12 and a connecting portion 13.

The first clamping portion 11 is of a plate-shaped configuration. Specifically, in the embodiment of the present disclosure, it is of a rectangular plate configuration. The first clamping portion 11 is fixed to the insertion portion 12. In first embodiment, referring to FIG. 4, the first clamping portion 11 and a base portion 121 of the insertion portion 12 are integrally structured. The fixed connection in the present disclosure includes integral molding. A plate surface of the first clamping portion 11 is perpendicular to a mating direction (i.e., a direction indicated by the double-headed arrow in FIG. 3). It should be understood that the plate surface of the plate structure is a surface with the largest area in the plate structure.

Referring to FIG. 2, the insertion portion 12 can be inserted into the second assembly 2 to realize mating of the first assembly 1 and the second assembly 2. Furthermore, a clamping space α is formed between the first clamping portion 11 and a second clamping portion 22 of the second assembly 2. The clamping space α can realize the clamping of the target object. The connecting portion 13 can be connected to an electronic device, thereby realizing the purpose of supporting the electronic device on the target object.

Figure 3:
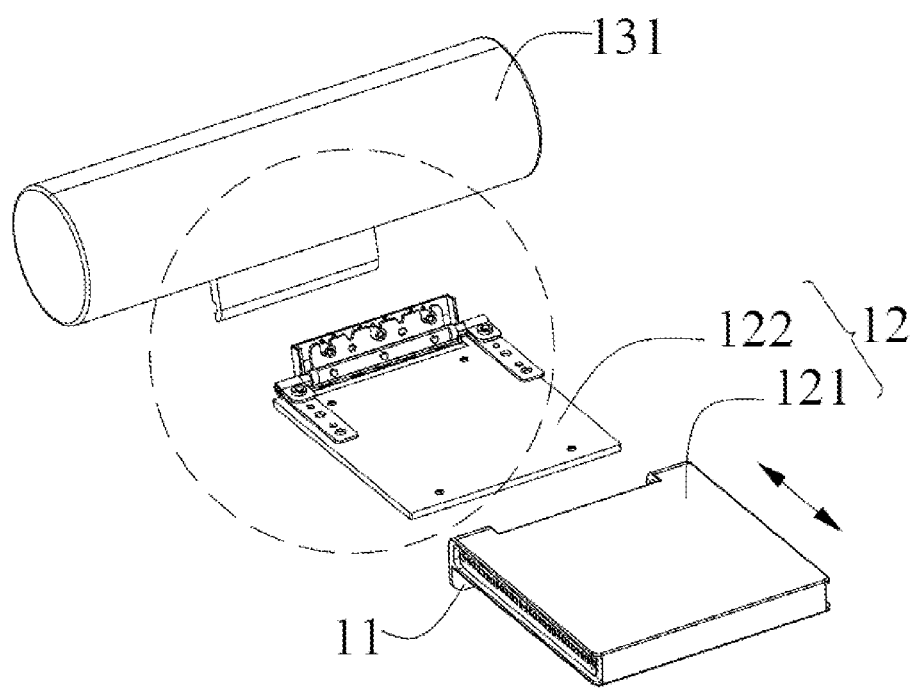
FIG. 3 is an exploded schematic view of a first assembly of the supporting device in accordance with the first embodiment of the present disclosure.
Figure 4:
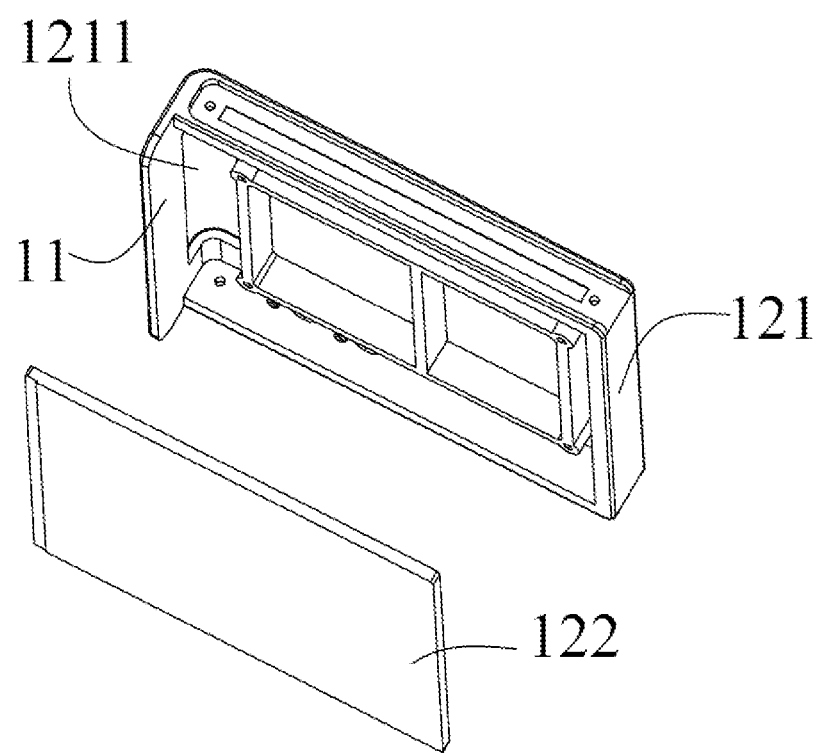
FIG. 4 is an exploded schematic view of a partial structure of the first assembly of the supporting device in accordance with the first embodiment of the present disclosure.

Referring to FIG. 3 and FIG. 4, the insertion portion 12 includes a rectangular base portion 121 with a rectangular cross-section, and a sealing plate 122 fixedly connected to an opening side of the base portion 121.

The insertion portion 12 is a hollow rectangular plate formed by the fixed connection of the base portion 121 and the sealing plate 122. The plate surface of the first clamping portion 11 is perpendicular to the insertion portion 12 (i.e., a plate surface of this rectangular plate).

A first avoidance hole 1211 is defined at an end of the insertion portion 12 located adjacent to the first clamping portion 11. The connecting portion 13 is connected to the insertion portion 12 through the first avoidance hole 1211.

Figure 5:
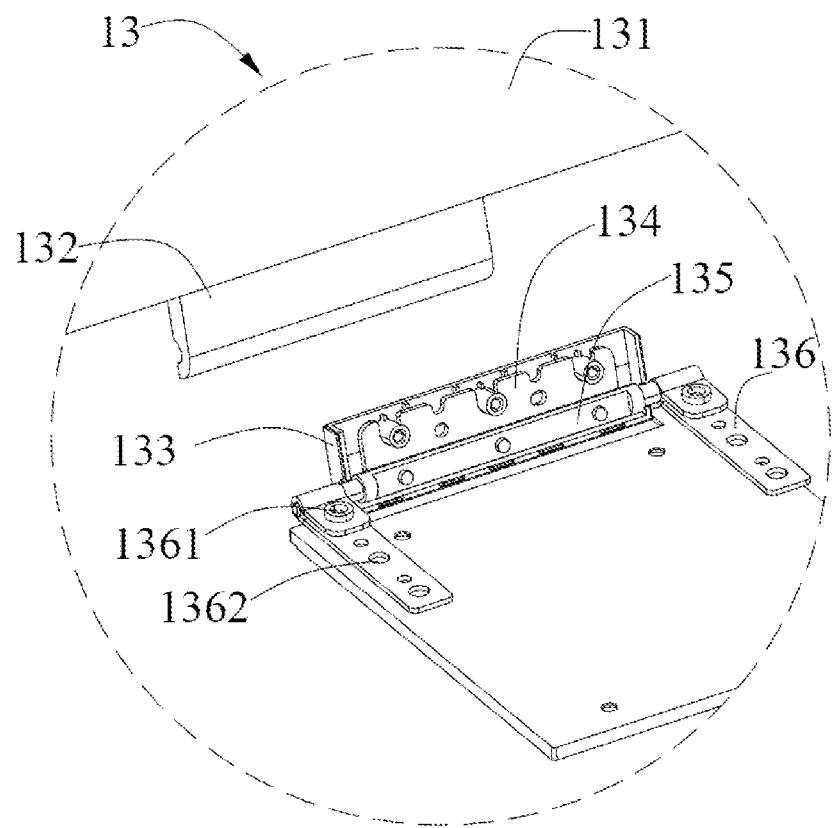
FIG. 5 is a partial enlarged view of FIG. 3.

Referring to FIG. 3 and FIG. 5, the connecting portion 13 includes a receiving member 131, a first shell 132, a second shell 133, a first connecting piece 134, a first rotating shaft 135 and a fixing seat 136.

In the first embodiment, the receiving member 131 is of a cylindrical or cylindrical-like structure. An electronic device with a cylindrical shape, such as a screen hanging lamp, can be inserted into the receiving member 131, and then fixed and supported at a target position by the supporting device. In other embodiments, the receiving member 131 may also be an accommodation member of other shapes with an accommodating space.

An outer periphery of the receiving member 131 is fixedly connected with the first shell 132. The first connecting piece 134 is fixedly connected with the first rotating shaft 135 through a pin. The first shell 132 is relatively fixedly connected with the first connecting piece 134 through a pin/hole structure. The second shell 133 is engaged with the first shell 132 through a locking structure, and is fixed with each other by bolts.

Two fixing seats 136 are provided. Two ends of the first rotating shaft 135 are fastened to the two fixing seats 136, respectively. Each fixing seat 136 includes a short piece, a long piece and a curved head connecting the short piece and the long piece. One of the two ends of the first rotating shaft 135 is inserted into the head of the fixing seat 136. A bolt pass through locking holes 1361 to fasten the short piece and the long piece of the fixing seat 136, and fix the short piece and the long piece to the insertion portion 12, so as to hold the first rotating shaft 135 between the short piece and the long piece. The long piece of each fixing seat 136 further defines a fixing hole 1362. Another bolt passes through the fixing hole 1362 to fix the fixing seat 136 to the insertion portion 12.

An electronic device is installed in the receiving member 131. The electronic device, the receiving member 131, the first shell 132, the second shell 133, the first connecting piece 134 and the first rotating shaft 135 are supported on the supporting device (or the target object) through the holding force of the fixing seat 136 to the first rotating shaft 135. When the position of the electronic device needs to be adjusted, an external force is applied to the receiving member 131 and transmitted to the first rotating shaft 135 through the first shell 132, the second shell 133 and the first connecting piece 134. When the applied external force exceeds the clamping force applied by the fixing seat 136 to the first rotating shaft 135, the electronic device together with the receiving member 131, the first shell 132, the second shell 133, the first connecting piece 134 and the first rotating shaft 135 rotate around a rotation axis defined by the head of the fixing seat 136 in a direction directed by the external force. After the electronic device is rotated to the target position, the external force is removed, and the electronic device and connected components are kept at the target position by the clamping force of the fixing seat 136.

The clamping force of the fixing seat 136 on the first rotating shaft 135 can be adjusted by rotating the bolt passing through the locking hole 1361. When the bolt is tightened towards the insertion portion 12, the long piece and the short piece are brought together, and the holding force of the fixing seat 136 to the first rotating shaft 135 increases, and vice versa, decreases.

Figure 6:
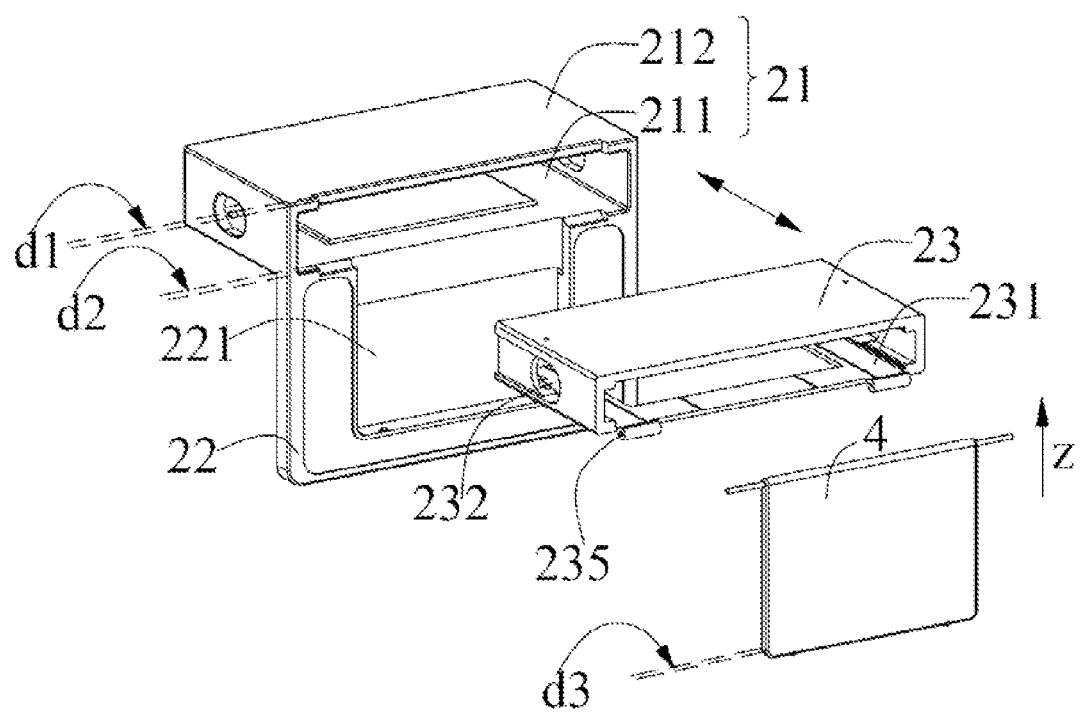
FIG. 6 is an exploded schematic view of a second assembly of the supporting device in accordance with the first embodiment of the present disclosure.
Figure 7:
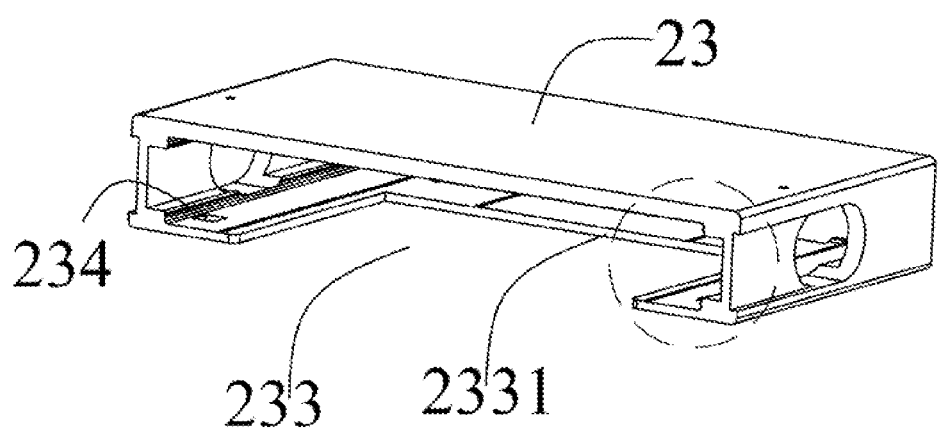
FIG. 7 is an axonometric schematic view of a limiting sleeve of the supporting device in accordance with the first embodiment of the present disclosure.
Figure 8:
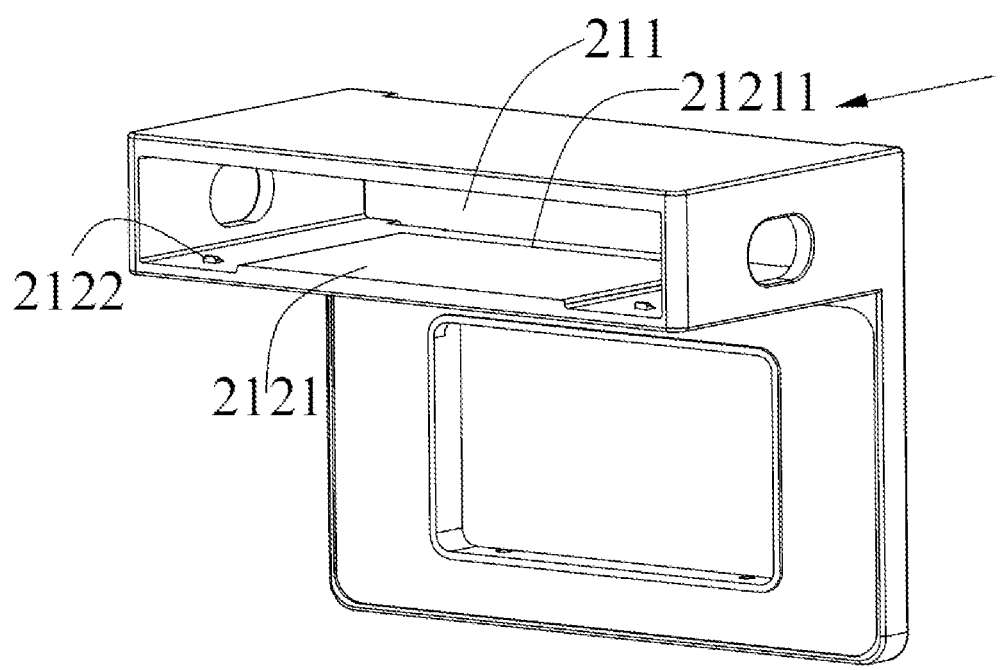
FIG. 8 is an axonometric schematic view of a partial structure of the second assembly of the supporting device in accordance with the first embodiment of the present disclosure.

Referring to FIG. 6 to FIG. 8, the second assembly 2 includes a receiving portion 21 and a second clamping portion 22.

The receiving portion 21 is of a rectangular cylindrical configuration with an inner rectangle and an outer rectangle. The receiving portion 21 includes two pairs of side walls 212 and a first through hole 211 enclosed by the two pairs of side walls 212. The second clamping portion 22 is of a plate-shaped configuration, and a plate surface of the second clamping portion 22 is perpendicular to the mating direction (i.e., a direction indicated by the double-headed arrow in FIG. 6). In the first embodiment, it can also be understood that the plate surface of the second clamping portion 22 is perpendicular to a wall surface of the side wall 212. One end of the second clamping portion 22 is fixed to one end of the receiving portion 21. In an embodiment, the second clamping portion 22 is integrally formed with the receiving portion 21.

The insertion portion 12 can be inserted into the receiving portion from one end of the receiving portion 21. Referring to FIG. 2, when the insertion portion 12 moves in the first through hole 211, a width a of the clamping space α formed between the first clamping portion 11 and the second clamping portion 22 varies, so that the supporting device has various clamping thicknesses.

Furthermore, when the clamped object, such as a screen, is very thin, the second assembly 2 can reverse its direction. The insertion portion 12 is inserted from the other end (i.e., an end connected to the second clamping portion 22) of the receiving portion 21. Since an outer plate surface of the second clamping portion 22 and an end surface of an end of the receiving portion 21 to which the second clamping portion 22 is fixed are located in the same plane, the clamping height of the clamping space α changes from the original b2 to b1 plus b2. As a result, the clamping surface is enlarged and the clamping is more stable.

Further, the first assembly 1 and the second assembly 2 will move relative to each other during the mating process, thereby causing scratches or abrasions. In order to avoid or reduce the scratches and abrasions, referring to FIGS. 6 to 8, a limiting sleeve 23 is provided inside the side wall 212. The limiting sleeve 23 can not only avoid or reduce abrasions, but also limit adjacent components. An outer periphery of the limiting sleeve 23 matches an inner wall of the side wall 212. A second through hole 231 matching an outer periphery of the insertion portion 12 is defined inside the limiting sleeve 23. When the first assembly 1 and the second assembly 2 are mated with each other, the insertion portion 12 passes through the second through hole 231.

Specifically, the limiting sleeve 23 is a sleeve with a rectangular cross section. The left and right sides of the limiting sleeve 23 (i.e., the sides where a positive direction and a negative direction of the x-axis points) define second avoidance holes 232 for passage of part of the structure of the limiting mechanism 3. The lower side of the limiting sleeve 23 is provided with a positioning structure so that it is relatively fixed with the side wall 212. Referring to FIG. 7, the positioning structure includes a first positioning groove 233 and a second positioning groove 234 which are provided on the limiting sleeve 23. Correspondingly, referring to FIG. 8, a first protrusion 2121 and a second protrusion 2122 are provided on the side wall 212. When the limiting sleeve 23 is inserted into the first through hole 211 (a direction of movement of the limiting sleeve 23 inserted into the first through hole 211 is shown by an arrow in FIG. 8), the first positioning groove 233 and the first protrusion 2121 enter into a mating state first. The first protrusion 2121 can guide the limiting sleeve 23 to a certain extent. Subsequently, the limiting sleeve 23 encounters the second protrusion 2122. The second protrusion 2122 is a protrusion with a guiding inclined surface. Under the guidance of the guiding inclined surface, the limiting sleeve 23 rises to a certain height (a certain height difference between the limiting sleeve 23 and the side wall 212 is provided for the limiting sleeve 23 to rise), and then the limiting sleeve 23 descends. The second positioning groove 234 covers the second protrusion 2122. At this time, a mating end surface 21211 of the first protrusion 2121 just fits with a mating end surface 2331 of the first positioning groove 233. As a result, the positioning structure engages and positions the limiting sleeve 23 in the side wall 212.

Figure 9:
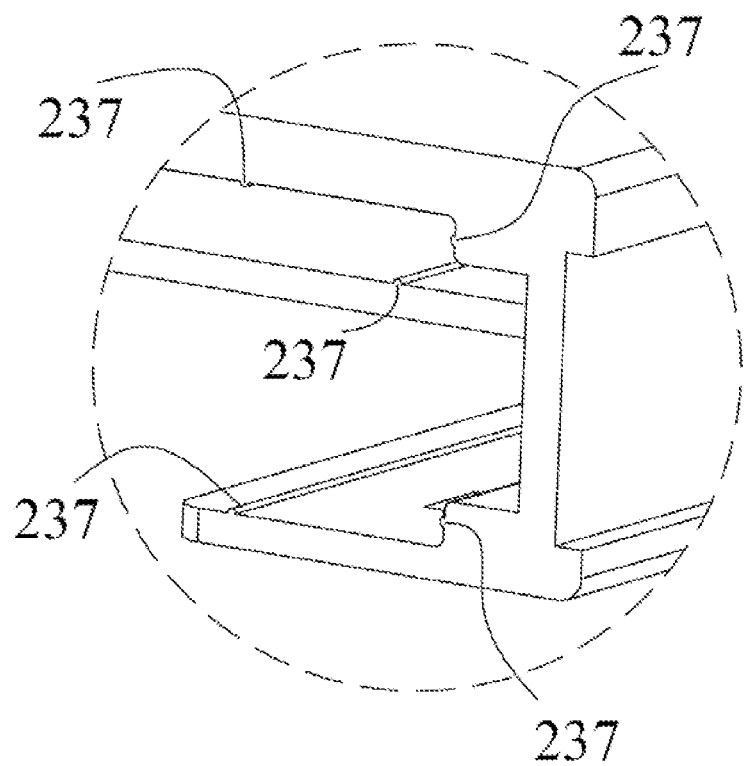
FIG. 9 is a partially enlarged view of FIG. 7.

Referring to FIG. 7 and FIG. 9, the limiting sleeve 23 has a plurality of third protrusions 237 inside. The third protrusions 237 protrude toward the second through hole 231. The third protrusions 237 extend along the mating direction of the first assembly 1 and the second assembly 2.

When the insertion portion 12 of the first assembly 1 is inserted into the receiving portion 21 of the second assembly 2, an outer surface of the insertion portion 12 abuts against the third protrusions 237. Optionally, the limiting sleeve 23 is made of plastic.

Furthermore, referring to FIG. 6, the limiting sleeve 23 further defines a first mounting hole 235 in which at least one installation shaft is disposed. An auxiliary supporting piece 4 of the supporting device is rotatably mounted through the installation shaft.

An accommodating groove 221 is defined on a plate surface of the second clamping portion 22 away from the receiving portion 21. A depth d2 of the accommodating groove 221 is equal to a thickness d3 of the auxiliary supporting piece 4. Therefore, when the auxiliary supporting piece 4 is accommodated in the accommodating groove 221, a distance between a plate surface of the auxiliary supporting piece 4 away from the receiving portion 21 and a plate surface of the second clamping portion 22 away from the receiving portion 21 are on the same plane. In order to keep the auxiliary supporting piece 4 in a fixed position in the accommodating groove 221 without shaking, the second clamping portion 22 and the auxiliary supporting piece 4 are provided with a positioning groove and a positioning protrusion which are mated with each other.

In order to push out the auxiliary supporting piece 4 from the accommodating groove 221 (in a non-working state), part of the accommodating groove 221 is made as a through groove. The reference numerals of the accommodating groove 221 in FIG. 6 point to the portion of the accommodating groove 221 made as a through groove, but the depth d2 of the accommodating groove 221 mentioned above is the thickness of the non-through groove portion.

When the auxiliary supporting piece 4 is working, it will turn over 180 degrees in a positive direction of the z-axis. Then, one plate surface of the auxiliary supporting piece 4 abuts against the side wall 212 of the receiving portion 21. The side wall 212 refers to the side wall 212 opposite to the mounting position of the auxiliary supporting piece 4 separated from the second through hole 231. In order to make a surface on an outer side of the expanded auxiliary supporting piece 4 and the outer surface of the second clamping portion 22 on the same plane (the outer side here refers to a side away from the receiving portion 21), the side wall 212 abutted by the auxiliary supporting piece 4 is retracted inwardly by a certain distance d1 along the mating direction to avoid a position. The certain distance d1 is equal to the thickness d3 of the auxiliary supporting piece 4.

When the target position is not suitable to be fixed by clamping, the auxiliary supporting piece 4 is opened, and the supporting device is placed in a manner perpendicular to the plate surface of the second clamping portion 22. The second clamping portion 22 and the auxiliary supporting piece 4 together serve as a supporting piece of the supporting device to stand the supporting device on a plane.

The three data d1, d2 and d3 appearing above are equal to each other, which is the optimal embodiment. Of course, the three data may not be equal. When the three data are not equal, it can be adjusted by changing the thickness of attached anti-skid layer. Alternatively, it is accepted that the outer surface of the auxiliary supporting piece 4 after expanding is not in the same plane as the outer surface of the second clamping portion 22.

Figure 10:
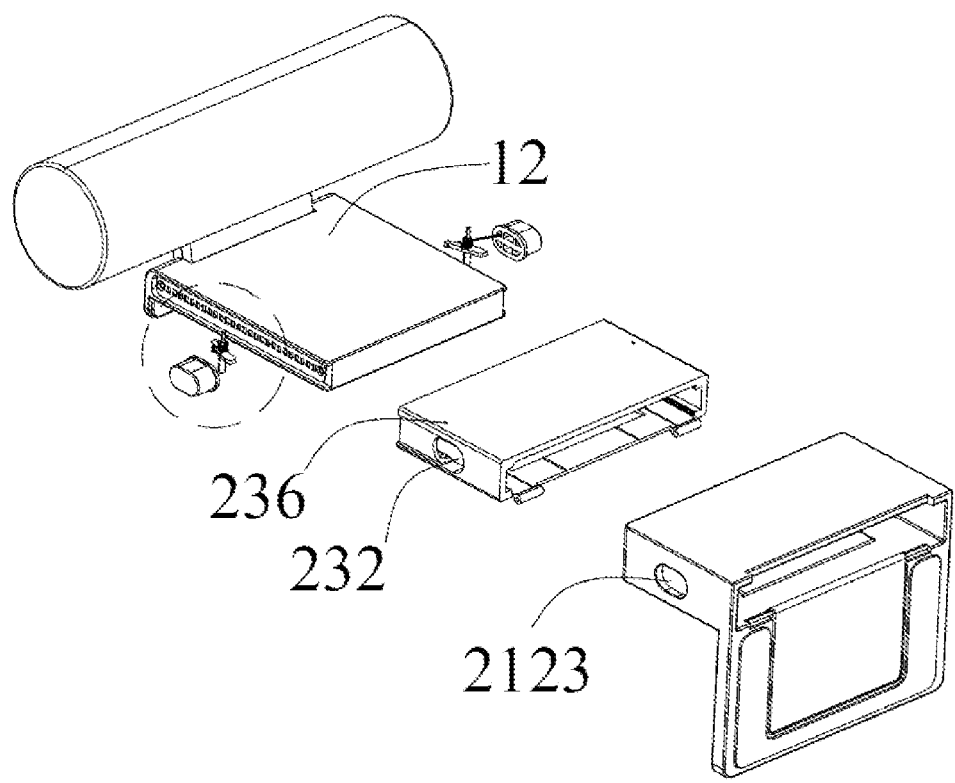
FIG. 10 is an exploded schematic view of the supporting device in accordance with the first embodiment of the present disclosure.
Figure 11:
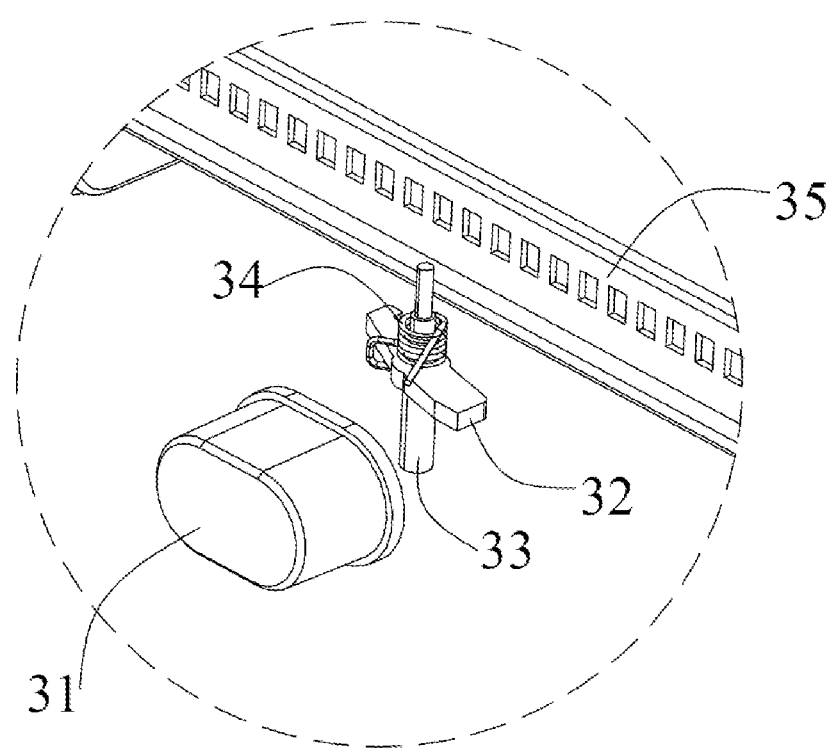
FIG. 11 is a partial enlarged view of FIG. 10.

Referring to FIG. 10 and FIG. 11, in the first embodiment, the limiting mechanism 3 includes a button 31, a swing plate 32, a second rotating shaft 33, a torsion spring 34 (corresponding to a first elastic member), and a locking rack 35. The second rotating shaft 33 is a stepped shaft including at least one step. A middle portion of the swing plate 32 is sleeved on the second rotating shaft 33 and supported on the step of the stepped shaft. The upper and lower ends of the second rotating shaft 33 are inserted into corresponding second mounting holes 236 on the limiting sleeve 23. One end of the swing plate 32 abuts against an inner side of the button 31, and the other end of the swing plate 32 is buckled into a groove of the locking rack 35. The torsion spring 34 is sheathed on the second rotating shaft 33. One end of the torsion spring 34 abuts against the inner side of the button 31, and the other end of the torsion spring 34 is hooked against an outer side of the swing arm of the swing plate 32 close to the locking rack 35. The locking rack is fixed on a side of the insertion portion 12. The locking rack 35 defines a plurality of grooves. The button 31 passes through the second avoidance hole 232 provided on the limiting sleeve 23 and the third avoidance hole 2123 provided on the side wall 212, and is movable in a vertical mating direction. In addition, in order to prevent the button 31 from detaching from the side wall 212 when moving outward, a step is provided on a side of the button 31 close to the side wall 212. The third avoidance hole 2123 is smaller than the second avoidance hole 232. The step of the button 31 can pass through the second avoidance hole 232 but cannot pass through the third avoidance hole 2123. That is, the step will prevent the button 31 from moving out of the side wall 212 when the button 31 is moved outward.

In the first embodiment, the limiting mechanism 3 is disposed on the left and right sides of the insertion portion 12 (i.e., the sides in the positive and negative directions of the x-axis). In other embodiments, the limiting mechanism 3 can also be disposed on the upper and lower sides of the insertion portion 12.

When in use, the user presses the button 31, the button 31 will move to an inside of the supporting device, and then press the swing plate 32 inside the button 31 and one end of the torsion spring 34. The swing plate 32 rotates around the second rotating shaft 33. An arm end of the swing plate 32 locked in the groove of the locking rack 35 will rotate outward, leave the groove, and enter an unlocked state. When in the unlocked state, the insertion portion 12 and the second assembly 2 can move relatively (when the limiting sleeve 23 is limited, the limiting sleeve 23 moves together with the second assembly 2). The user can give the button 31 a force along the mating direction while pressing the button 31. The limiting sleeve 23 and the second assembly 2 will move under the drive of the button 31, thereby changing the width a of the clamping space α. When moving to a suitable position, the user releases the button 31. Driven by the torsion spring 34, the swing plate 32 rotates around the second rotating shaft 33, so that the arm end close to the insertion portion 12 is locked in the groove of the locking rack 35, and enters a locked state. In the locked state, the insertion portion 12 and the second assembly 2 cannot move relative to each other.

The torsion spring 34 in the foregoing embodiments can also be configured as a spring. One end of the spring abuts or is fixedly connected to the inner side of the button 31, and the other end of the spring abuts or is fixedly connected to the outer side of the swing arm of the swing plate 32 close to the locking rack 35. When an external force is applied to the button 31, the swing plate 32 rotates and enters an unlocked state. At this time, the spring is compressed. When the external force is released, the swing plate 32 rotates under the elastic force of the spring, and the swing arm close to the locking rack 35 is locked in the locking rack 35 again to enter a locked state.

Furthermore, when the limiting sleeve 23 is not provided in the second assembly 2, the aforementioned limiting mechanism 3 can also be used. It only needs to set the second rotating shaft 33 in the limiting mechanism 3 in the first through hole 211 in the receiving portion 21.

In order to make the working state more stable when the supporting device is clamped or stood at the target position, an anti-slip layer, such as a rubber layer, is provided on a surface involved when the supporting device is clamped or stood. This also avoids or reduces possible pinching of the target position.

A second embodiment is also disclosed in the present disclosure. The main differences between the second embodiment and the first embodiment lie in the specific embodiment of the connecting portion 13, the specific arrangement of the limiting mechanism 3, the absence of the limiting sleeve 23, and some changes brought because of the absence of the limiting sleeve 23. The following will mainly introduce the differences between the second embodiment and the first embodiment.

It is noted that the same or corresponding technical features in the second embodiment and the first embodiment use the same reference numerals.

Figure 12:
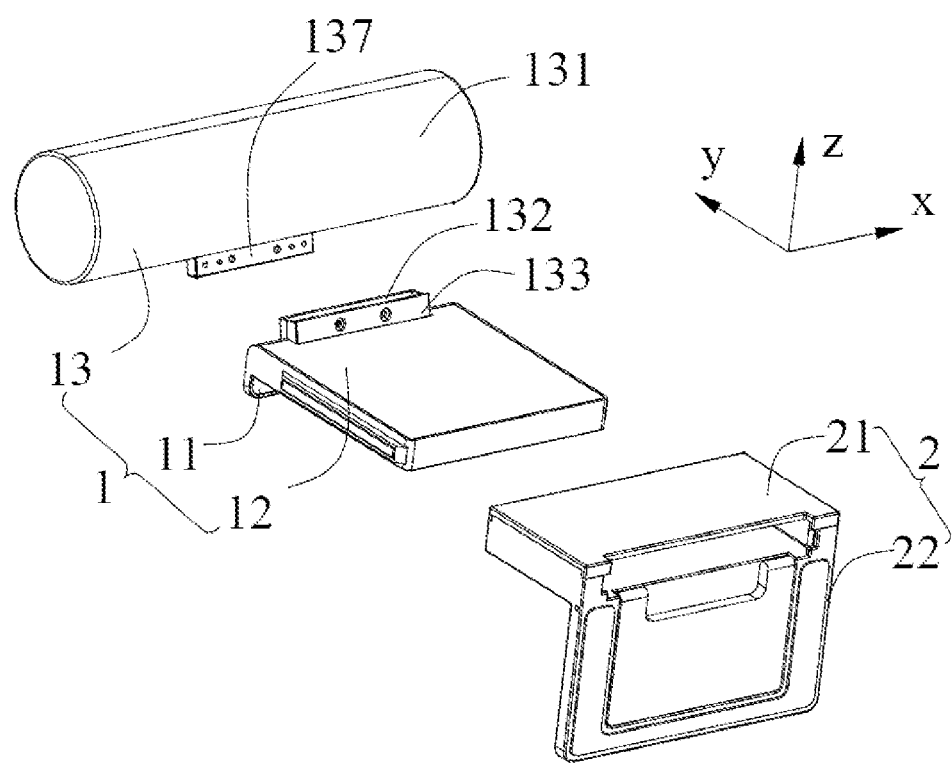
FIG. 12 is an exploded schematic view of the supporting device in accordance with a second embodiment of the present disclosure.
Figure 13:
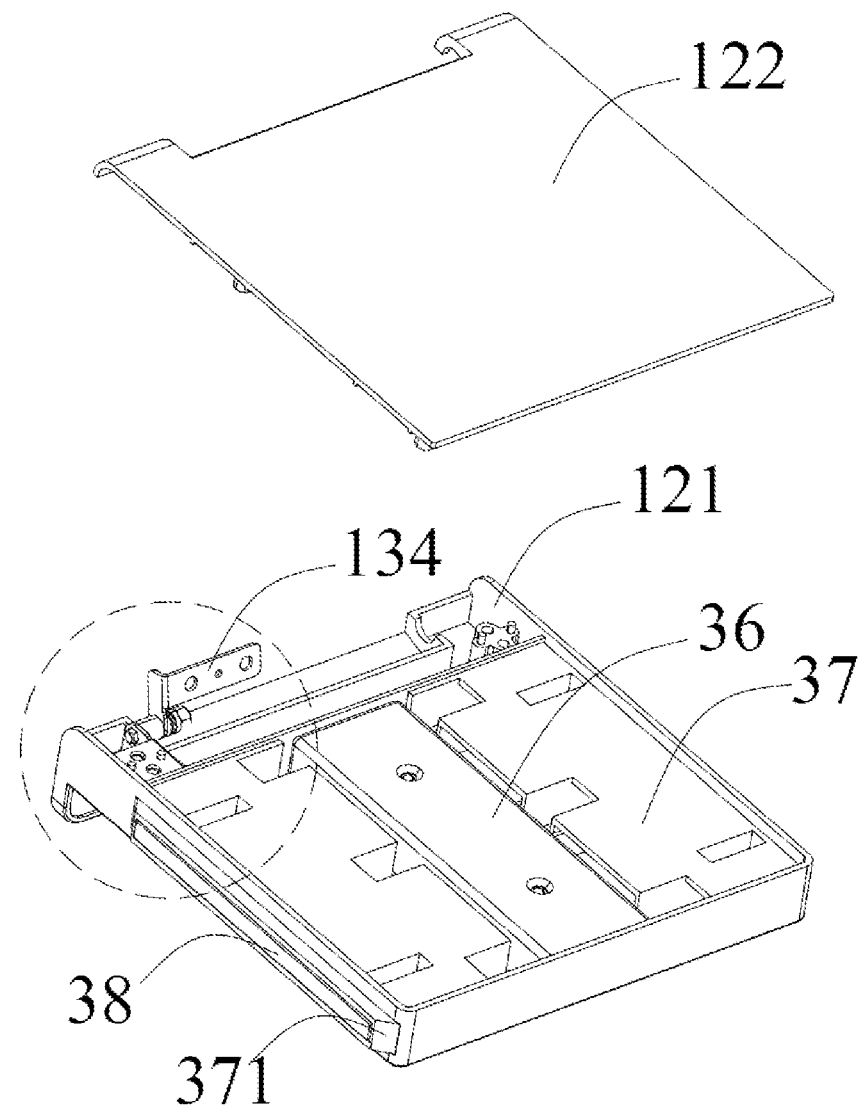
FIG. 13 is an exploded schematic view of a partial structure of the first assembly of the supporting device in accordance with the second embodiment of the present disclosure.
Figure 14:
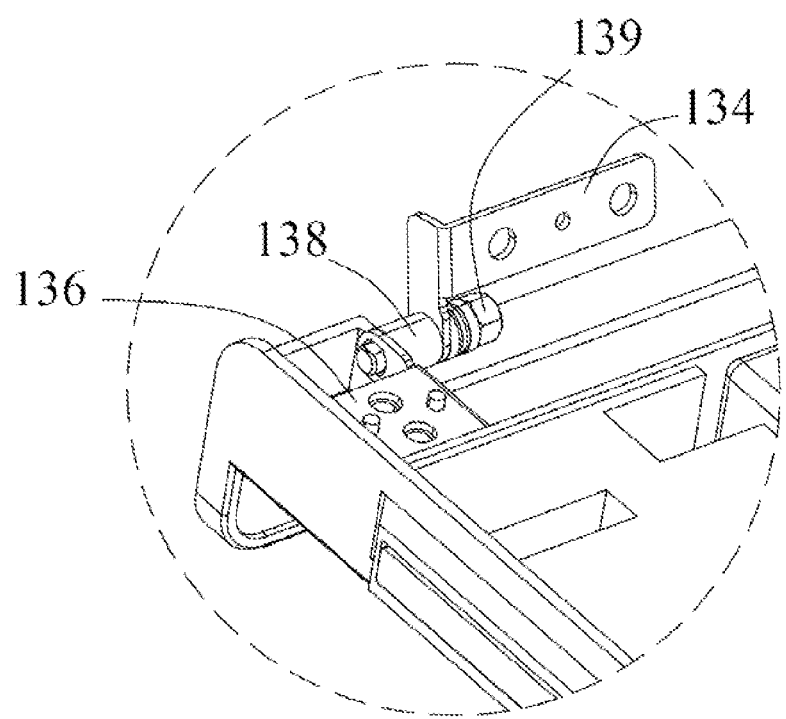
FIG. 14 is a partial enlarged view of FIG. 13.

Referring to FIG. 12 to FIG. 14, the connecting portion 13 includes a receiving member 131, a first shell 132, a second shell 133, a first connecting piece 134, a fixing seat 136, a second connecting piece 137, a shaft core 138, and a fastening member 139.

The receiving member 131 is fixedly connected to the second connecting piece 137. The second connecting piece 137, the first connecting piece 134, the first shell 132 and the second shell 133 are fixedly connected to one another. One end of the first connecting piece 134 is screwed onto the shaft core 138 through the fastening member 139. The shaft core 138 engages with the fixing seat 136. The fixing seat 136 is fixed on the first assembly 1.

When the position of the electronic device in the receiving member 131 needs to be adjusted, an external force presses the receiving member 131. The receiving member 131 and the first connecting piece 134, the second connecting piece 137, the first shell 132 and the second shell 133 which are fixedly connected with the receiving member 131 all rotate around an outer circumference of the aforementioned shaft core 138. When the external force is removed, the receiving member 131 and the parts fixedly connected thereto remain in the target position.

When the clamping force or tightening force of the first connecting piece 134 needs to be changed, such as the external electronic device changes or the weight changes, the tightening force required to maintain balance changes, then the tightening force of the first connecting piece 134 can be changed by twisting the fastening member 139. Optionally, the shaft core 138 is a bolt, and the fastening member 139 is a nut.

The insertion portion 12 also includes a base portion 121 with a rectangular cross section and a sealing plate 122 fixedly connected to an opening side of the base portion 121. The difference between the second embodiment and the first embodiment is that the opening side of the base portion 121 is located on an upper side of the base portion 121 in the second embodiment.

Referring to FIG. 13, the limiting mechanism 3 in the second embodiment includes a limiting member 36, a sliding member 37, a second elastic member (not shown) and a locking piece 38.

The limiting member 36 is fixed in the middle of the base portion 121 by bolts. The sliding member 37 is slidably disposed on two sides of the limiting member 36. A guide plate and/or a frame of the base portion 121 guides the sliding of the sliding member 37. A side of the base portion 121 defines a through hole. One end of the sliding member 37 is located adjacent to the limiting member 36, and the other end of the sliding member protrudes out of a side of the base portion 121 through the through hole on the side of the base portion 121.

The second elastic member is disposed between the sliding member 37 and the limiting member 36. When the external force presses the sliding member 37, the sliding member 37 approaches the limiting member 36, and the second elastic member is compressed. When the external force is removed, the second elastic member gives the sliding member 37 a force to slide in an opposite direction (i.e., moving away from the limiting member 36). A step is provided on the sliding member 37 to prevent the sliding member 37 from slipping out of the through hole on the side of the base portion 121.

The locking piece 38 is connected to a side of the sliding member 37 protruding beyond the base portion 121. The locking piece 38 is a piece with high friction, such as a rubber pad; and the connection method can be pasted.

Figure 15:
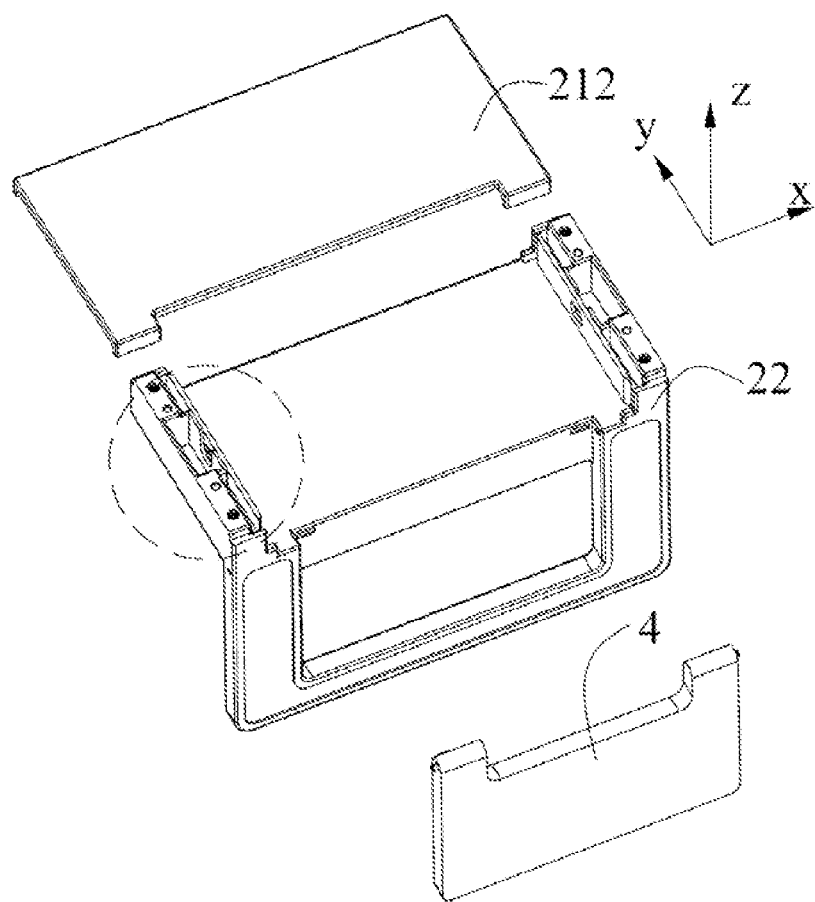
FIG. 15 is an exploded schematic view of the second assembly of the supporting device in accordance with the second embodiment of the present disclosure.

The receiving portion 21 is a rectangular cylindrical structure with a cross section having an inner rectangle and an outer rectangle, wherein an upper side wall is detachably fixed to other side walls, as shown in FIG. 15.

Figure 16:
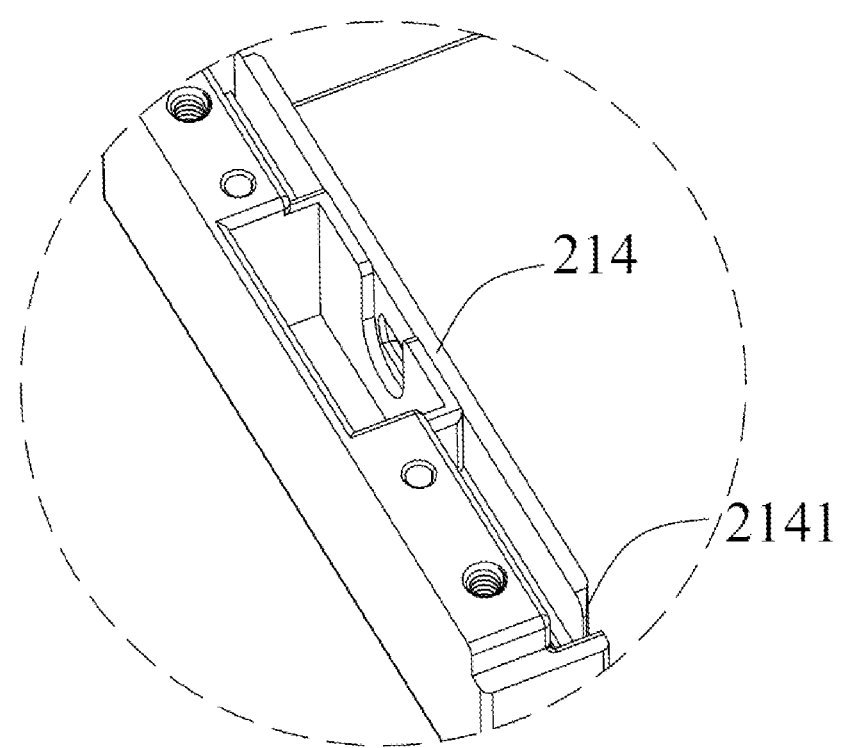
FIG. 16 is a partially enlarged view of FIG. 15.

Referring to FIG. 16, a pressing piece 214 is fixedly connected to the inner wall surface on the left and right side walls of the receiving portion 21 through a third elastic member (not shown). First guiding segments 2141 are provided at two ends of the pressing piece 214 along the mating direction. Correspondingly, second guiding segments 371 are provided at two ends of the sliding member 37 protruding beyond the side wall of the base portion 121 (see FIG. 13). The first guiding segments 2141 and the second guiding segments 371 can facilitate the insertion portion 12 and the receiving portion 21 to enter into a mating state.

When the relative positional relationship between the insertion portion 12 and the receiving portion 21 needs to be adjusted, the locking piece 38 is pressed. The sliding member 37 will move towards an inside of the base portion 121. The locking piece 38 is separated from the pressing piece 214. The receiving portion 21 is moved to adjust the position, and the external force is removed after the position adjustment is completed. The sliding member 37 moves to the outside of the base portion 121 under the action of the second elastic member, so that the locking piece 38 contacts and presses the pressing piece 214 again. The pressing piece 214 is forced to move inwardly by the third elastic member while moving outwardly. When the elastic forces of the second elastic member and the third elastic member are balanced, the pressing piece 214 is pressed against the locking piece 38 and the position remains stable. The insertion portion 12 and the receiving portion 21 are kept at the adjusted position under the friction force between the pressing piece 214 and the locking piece 38.

In the second embodiment, the limiting sleeve 23 is not provided. Correspondingly, the auxiliary supporting piece 4 is directly and rotatably connected to the second assembly 2 through a rotating shaft (see FIG. 15).

The sliding member 37 can be made of plastic material, so that the overall structure is lighter. Since the sliding member 37 and the pressing piece 214 are in a mutual pressing state for a long time, in order to increase the service life of the sliding member 37, a metal structural member can be added in the sliding member 37 to enhance the strength of the sliding member 37. In one embodiment, the pressing piece 214 can be made of metal.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A supporting device, comprising:
  a first assembly configured to be connected to a supported object;
  a second assembly, the first assembly and the second assembly being configured to mate with each other; a clamping space being formed between the first assembly and the second assembly after being mated with each other; the clamping space being configured to clamp a target object; and
  a limiting mechanism configured to make the first assembly and the second assembly in a relatively fixed state; the limiting mechanism comprising a swing plate and a locking rack, the swing plate being movable, the locking rack defining a plurality of grooves, and the swing plate being in lock with a corresponding groove when the first assembly and the second assembly in the relatively fixed state;
  wherein the first assembly comprises an insertion portion, a first clamping portion and a connecting portion; the first clamping portion is fixedly connected with the insertion portion; a first avoidance hole is opened at an end of the insertion portion connected to the first clamping portion; the connecting portion is connected to the insertion portion through the first avoidance hole; and the connecting portion is configured to be connected to the supported object.

2. The supporting device according to claim 1, wherein the first clamping portion is of a plate-shaped configuration, and a plate surface of the first clamping portion is perpendicular to a mating direction of the first assembly and the second assembly.

3. The supporting device according to claim 2, wherein the second assembly comprises a receiving portion and a second clamping portion fixedly connected with the receiving portion;
the receiving portion comprises a first through hole and a side wall surrounding the first through hole;
the insertion portion is configured to be inserted into the first through hole from one end of the receiving portion, so that the first assembly and the second assembly are mated with each other;
the second clamping portion is of a plate-shaped configuration, and a plate surface of the second clamping portion is perpendicular to the mating direction;
the clamping space is a space located between the first clamping portion and the second clamping portion.

4. The supporting device according to claim 3, wherein one end of the second clamping portion is fixed to an end of the receiving portion; a plate surface of the second clamping portion away from the receiving portion is located in a same plane as an end surface of the end of the receiving portion to which the second clamping portion is fixed.

5. The supporting device according to claim 1, wherein the connecting portion comprises a receiving member, a first rotating shaft and a fixing seat; the supported object is configured to be accommodated in the receiving member; the receiving member is fixedly connected to the first rotating shaft; at least one end of the first rotating shaft is installed in the fixing seat; the fixing seat is fixed to the insertion portion; when an external force is applied to the receiving member, the first rotating shaft is rotatable relative to the fixing seat.

6. The supporting device according to claim 3, wherein the second assembly further comprises a limiting sleeve; a second through hole matching an outer periphery of the insertion portion is defined inside the limiting sleeve; an outer periphery of the limiting sleeve is relatively fixed to the side wall through a positioning structure; the positioning structure comprises a mating groove and a protrusion mating with the mating groove.

7. The supporting device according to claim 3, wherein the limiting mechanism comprises a button, a second rotating shaft and a first elastic member; the locking rack is fixed on a side of the insertion portion; the second rotating shaft is either disposed in the first through hole or disposed in a second through hole of a limiting sleeve which is located in the first through hole;
the second rotating shaft passes through a middle portion of the swing plate; one swing arm of the swing plate is disposed adjacent to an inner side of the button, and another swing arm of the swing plate is disposed adjacent to the locking rack;
one end of the first elastic member acts on the inner side of the button; another end of the first elastic member acts on an outer side of the another swing arm; the another swing arm is configured to be locked in the grooves under the action of the first elastic member;
the button is capable of partly passing through and protrudes beyond the side wall.

8. The supporting device according to claim 3, wherein the insertion portion comprises a base portion with a rectangular section, and a sealing plate fixedly connected to an opening side of the base portion.

9. A supporting device, comprising:
a first assembly configured to be connected to a supported object;
a second assembly, the first assembly and the second assembly being configured to mate with each other; a clamping space being formed between the first assembly and the second assembly after being mated with each other; the clamping space being configured to clamp a target object; the second assembly comprising a receiving portion and a second clamping portion fixedly connected with the receiving portion;
a limiting mechanism configured to make the first assembly and the second assembly in a relatively fixed state; the limiting mechanism comprising a swing plate and a locking rack, the swing plate being movable, the locking rack defining a plurality of grooves, and the swing plate being in lock with a corresponding groove when the first assembly and the second assembly in the relatively fixed state; and
an auxiliary supporting piece;
wherein the second assembly further comprises a limiting sleeve; the auxiliary supporting piece is rotatably installed on the limiting sleeve in the receiving portion, wherein an installation position corresponds to a side wall end of the receiving portion which is fixedly connected with the second clamping portion;
an accommodating groove is defined on a plate surface of the second clamping portion away from the receiving portion; the auxiliary supporting piece in a non-working state is accommodated in the accommodating groove.

10. The supporting device according to claim 9, wherein a minimum depth of the accommodating groove is equal to a thickness of the auxiliary supporting piece.

11. The supporting device according to claim 9, wherein the receiving portion comprises a first through hole and a side wall surrounding the first through hole; the first clamping portion is of a plate-shaped configuration, and a plate surface of the first clamping portion is perpendicular to a mating direction of the first assembly and the second assembly; a wall end of the receiving portion spaced apart from an opposite wall end by the first through hole is recessed into an inside of the receiving portion by a certain distance along the mating direction; and the certain distance is equal to a thickness of the auxiliary supporting piece.

12. A supporting device, comprising:
a first assembly comprising an insertion portion, a first clamping portion fixedly connected with the insertion portion, and a connecting portion rotatably connected to the insertion portion; the connecting portion being configured to be connected to a supported object;
a second assembly comprising a receiving portion and a second clamping portion fixedly connected with the receiving portion; the insertion portion being inserted into the receiving portion so as to from a changeable clamping space between the first clamping portion and the second clamping portion; the clamping space being configured to clamp a target object; the receiving portion comprising a first through hole and a side wall surrounding the first through hole; and a limiting mechanism configured to make the first assembly and the second assembly in a relatively fixed state when the target object is clamped in place;

wherein the limiting mechanism comprises a button, a swing plate, a second rotating shaft, a first elastic member and a locking rack; the locking rack is fixed on a side of the insertion portion and defines a plurality of grooves; the second rotating shaft is either disposed in the first through hole or disposed in a second through hole of a limiting sleeve which is located in the first through hole;

the second rotating shaft passes through a middle portion of the swing plate; one swing arm of the swing plate is disposed adjacent to an inner side of the button, and another swing arm of the swing plate is disposed adjacent to the locking rack;

one end of the first elastic member acts on the inner side of the button; another end of the first elastic member acts on an outer side of the another swing arm; the another swing arm is configured to be locked in the grooves under the action of the first elastic member;

the button is capable of partly passing through and protrudes beyond the side wall.

13. The supporting device according to claim 12, wherein the first clamping portion is of a plate-shaped configuration, and a plate surface of the first clamping portion is perpendicular to a mating direction of the first assembly and the second assembly;

the insertion portion is inserted into the first through hole from one end of the receiving portion, so that the first assembly and the second assembly are mated with each other;

the second clamping portion is of a plate-shaped configuration, and a plate surface of the second clamping portion is perpendicular to the mating direction.

14. The supporting device according to claim 13, wherein the connecting portion comprises a receiving member, a first rotating shaft and a fixing seat; the supported object is configured to be accommodated in the receiving member; the receiving member is fixedly connected to the first rotating shaft; at least one end of the first rotating shaft is installed in the fixing seat; the fixing seat is fixed to the insertion portion; when an external force is applied to the receiving member, the first rotating shaft is rotatable relative to the fixing seat.

15. The supporting device according to claim 9, wherein the first assembly comprises an insertion portion, a first clamping portion and a connecting portion; the first clamping portion is fixedly connected with the insertion portion; a first avoidance hole is opened at an end of the insertion portion connected to the first clamping portion; the connecting portion is connected to the insertion portion through the first avoidance hole; and the connecting portion is configured to be connected to the supported object.

16. The supporting device according to claim 9, wherein the first clamping portion is of a plate-shaped configuration, and a plate surface of the first clamping portion is perpendicular to a mating direction of the first assembly and the second assembly.

17. The supporting device according to claim 16, wherein the second assembly comprises a receiving portion and a second clamping portion fixedly connected with the receiving portion;

the receiving portion comprises a first through hole and a side wall surrounding the first through hole;

the insertion portion is configured to be inserted into the first through hole from one end of the receiving portion, so that the first assembly and the second assembly are mated with each other;

the second clamping portion is of a plate-shaped configuration, and a plate surface of the second clamping portion is perpendicular to the mating direction;

the clamping space is a space located between the first clamping portion and the second clamping portion.

18. The supporting device according to claim 17, wherein one end of the second clamping portion is fixed to an end of the receiving portion; a plate surface of the second clamping portion away from the receiving portion is located in a same plane as an end surface of the end of the receiving portion to which the second clamping portion is fixed.

19. The supporting device according to claim 12, wherein a first avoidance hole is opened at an end of the insertion portion connected to the first clamping portion; the connecting portion is connected to the insertion portion through the first avoidance hole; and the connecting portion is configured to be connected to the supported object.

20. The supporting device according to claim 12, wherein the insertion portion comprises a base portion with a rectangular section, and a sealing plate fixedly connected to an opening side of the base portion.

* * * * *